Patented Oct. 25, 1949

2,486,190

UNITED STATES PATENT OFFICE 2,486,190

IMIDIZED POLYACRYLAMIDES

Louis M. Minsk and William O. Kenyon, Rochester, N. Y., assignors to Eastman Kodak Company, Rochester, N. Y., a corporation of New Jersey No Drawing. Application July 22, 1946, Serial No. 685,376

11 Claims. (Cl. 260—89.7)

This invention relates to synthetic resins containing imide groupings and more particularly to polyacrylamides and polymethacrylamides containing substantial amounts of cyclic imide groupings. It also relates to a process for the preparation of such compounds.

It is known that monomeric acrylamide can be made to polymerize in mass by merely heating the monomer. During such a polymerization, ammonia is evolved (Moureau, Ann. chim. (7), 2, 175 (1894); Staudinger and Urech, Helv. chim. Acta. 12, 1107 (1929). The resulting so-called "polyacrylamide" is not a polymer built up of separate chains of hydrocarbons having only amide groups appended thereto, but a ploymer in which some of the amide groups of separate chains, because of close proximity in mass polymerization, have intermolecularly condensed together with loss of ammonia to form imide (—CO—NH—CO) cross-linkages between chains, and accordingly, possess the insolubility characteristic of all three-dimensional polymers. Other water-insoluble ployacrylamides have been prepared by condensing polyacrylyl chloride with gaseous ammonia. While these condensation products apparently contain some intramolecular imide units or diketo-piperidine units, from condensation of adjacent amide groups on the same chain, the products also contain a number of imide cross-linkages between chains as evidenced by insolubility of these products.

However, water-soluble types of polyacrylamides and polymethacrylamides have been prepared by a number of methods. For example, by partly saponifying the aforesaid insoluble polymers of acrylamide or alpha-methacrylamide with aqueous sodium hydroxide, there have been obtained water-soluble products characterized by having a high carboxyl group (—COOH) content. Another method for obtaining water-soluble types of polyacrylamide or polymethacrylamide has involved polymerizing aqueous solutions of the corresponding monomers, in the presence of hydrogen peroxide or a water-soluble per-salt as a catalyst. It appears that when polymerization is brought about in solution, proximity of chains is greatly reduced and, though the same tendency to lose ammonia is present as in mass polymerizations, the elements of ammonia are extracted intramolecularly to form cyclic imide groups rather than cross-linkages, and the products in most cases are water-soluble. Combined acrylic acid is simultaneously formed, though the amount of this constituent is small, unless the polymer be heated for an unusually long time after polymerization is complete.

The foregoing indicates that polymeric acrylamides have been prepared by a number of methods, the products obtained thereby differing widely in properties, especially in solubilities, and that such products have not been clearly defined as to structures.

We have now found that water-soluble polyacrylamides prepared by polymerizing monomeric acrylamide in water or in water-alcohol mixtures, using hydrogen peroxide or a per-salt as a catalyst, or water-soluble poly-alpha-methacrylamides prepared in the same manner from monomeric alpha-methacrylamide, or these polymers prepared by hydrolysis of polyacrylonitriles or amidation of poly-alkylacrylates with ammonia, can be converted by treatment with acids having dissociation constants greater than $1 \times 10^{-3}$, for example, with a strong mineral acid such as hydrobromic, hydrochloric, sulfuric, nitric, or weaker acids such as phosphoric, tartaric, malonic, oxalic, dichloracetic, para-toluene sulphonic, perchloric acids and other similar kind of acids, to imidized products of controlled solubilities and structural compositions, and having acrylimide group content substantially greater than the estimated 20 per cent by weight of acrylimide in the original untreated polyacrylamide and up to about 70 per cent, but preferably imidized products having about from 30 to 60 per cent of the product in the form of acrylimide groups and about from 70 to 40 per cent in the form of acrylamide and combined acrylic acid groups. The amount of the latter will be greater with longer acid treatment and with increasing imide content of the polymer, the variation being about from 1 to 30 per cent, but preferably about from 5 to 20 per cent of the weight of the product. The total nitrogen content of our imidized products is combined in the form of acrylimide nitrogen and acrylamide nitrogen. For example, the preferred products have about from 20 to 50 per cent by weight of the total nitrogen combined as imide nitrogen and about from 80 to 50 per cent as amide nitrogen. These preferred products have the unique property, in their acid form, of separating from their water solutions at some definite temperature above 0° C. This temperature is dependent upon the acrylimide content, for as the acrylimide increases, the temperature at which separation occurs likewise increases. This may also be influenced by molecular weight. Some of our new products separate, upon cooling, in the form of milky colloids which slowly agglomerate, while others upon treatment of their aqueous solutions with ammonia or with an alkali, upon cooling, form reversible gels. The latter effect of gelling takes place only with the higher molecular weight imidized products and is caused by partial neutralization of the combined acrylic acid groups. The relative molecular weights of the products can be calculated from the viscosities of their solutions in suitable solvents. A typical high molecular weight imidized product, which showed by analysis to contain 13.26 per cent by weight of nitrogen, 43.9 per cent acrylamide groups, 42.3 per cent acrylimide groups and 13.80 per cent of combined acrylic acid groups, had a minimum solution temperature above 100° C. However, on making a 2 per cent solution of the product in water and adding sodium hydroxide sufficient to neutralize about 14.4 per cent of the combined acrylic acid groups, the solution on cooling failed to show a minimum solution temperature, but instead set to a soft, non-flowable, reversible gel. The minimum solution temperature (M. S. T.) is the temperature at which the polymer separates out of solution, and is determined by warming 0.250 gram of the polymer with 10 cc. of distilled water in a test tube, stirring with a thermometer meanwhile. When solution is complete, the dope in the tube is slowly cooled, while continuing to stir the dope. The temperatures at which the dope becomes opalescent and then turbid are noted. The latter temperature is the M. S. T.

We have also found that water-soluble polyacrylamides having acrylimide content substantially above 25 per cent by weight and also having the property of precipitating from their aqueous solutions by the addition of acid, can be prepared from polyacrylyl chloride by the process of slowly adding the polyacrylyl chloride, dissolved in dry acetone, to an excess of liquid ammonia. The polyacrylyl chloride can be prepared by polymerizing monomeric acrylyl chloride in a solution of 1,4-dioxane, using the radiation of a quartz mercury arc lamp to promote the polymerization. The process of preparing water-soluble polyacrylamides from polyacrylyl chloride and liquid ammonia is described and claimed in our copending application Serial No. 685,377, filed of even date herewith now United States Patent 2,469,696, dated May 10, 1949.

Structurally, our new imidized products can be represented by one of the following structures depending on whether the polymerization of the monomeric compounds takes place in a random order, or head to tail, or head to head, tail to tail sequence:

1-a.

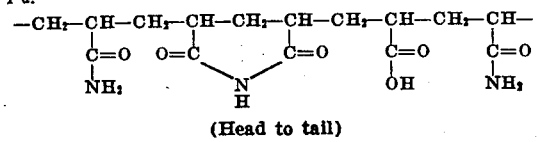

(Head to tail)

1-b.

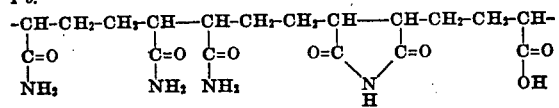

(Head to head, tail to tail)

The above formulas are only illustrative with no attempt made to place the respective groups upon a quantitative relationship. However, for analytical and definitive purposes, the term "combined acrylic acid" refers to the group

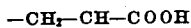

the term "acrylamide" to the group

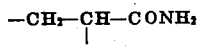

and the term "acrylimide" to the group

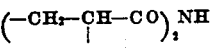

The term "imidized polyacrylamide" includes those products wherein the acrylimide group constitute over 20 per cent and the combined acrylimide and acrylamide groups constitute at least 70 per cent by weight of the product and the rest of the product is combined acrylic acid groups. Our new products defined in the preceding are valuable colloidizing materials. They can also be coated under suitable conditions into clear films which can be hardened and insolubilized by such reagents as formaldehyde, zirconium salts and other tanning agents.

It is, accordingly, an object of our invention to provide the imidized products above described. Another object is to provide processes for producing such imidized products. Other objects will become apparent hereinafter.

The polyacrylamides employed as the starting materials for our new products and processes can be obtained by direct polymerization of the monomers in water, the molecular weights of the polymers, as measured by their viscosities in aqueous solutions, being varied through a wide range by the use of various amounts of catalyst and by the addition of alcohol up to about 40 per cent by volume in the polymerization solvent mixtures. The process of preparing these water-soluble polyacrylamides is described and claimed in copending application of Minsk, Kenyon and Van Campen Serial No. 685,378, filed of even date herewith. These starting polyacrylamides are all water-soluble and are characterized by having a content about 20 per cent or less by weight of acrylimide groups, less than one per cent of combined acrylic acid groups, but in some cases as high as 3 per cent or greater, depending upon the length of polymerization heating, and further characterized by the fact that their aqueous solutions are unaffected in solubility, when the pH and temperatures of the solutions are lowered. After undergoing treatment by our imidizing process with acids having dissociation constants greater than $1 \times 10^{-3}$, the aforesaid polymers have up to about 70 per cent by weight of acrylimide groups, up to about 28 per cent combined acrylic acid groups and the remainder as acrylamide groups, and will precipitate from their aqueous solutions, when the pH and temperature of the solutions are lowered, that is, the acid form precipitates at some temperature above 0° C. The specific viscosities can be determined by dissolving the polymer in 100 cc. of distilled water and measuring the time of solution flow, divided by the time of solvent flow, minus one, in an Ostwald viscosimeter at 25° C. In similar manner, the viscosities of the polymers which are insoluble in water at 25° C. can be determined, except that an ammonia solution prepared by diluting one or two cc. as the case may be, of concentrated ammonium hydroxide to 100 cc. of distilled water, replaces water alone. In general, it can be stated that all our imidized polyacrylamides will give clear or nearly clear aqueous solutions at some temperature above 0° C. The nitrogen present as imide nitrogen ranges about from 20-90 per cent by weight of the total nitrogen, but as already indicated, the preferred products range in imide nitrogen about from 20-50 per cent by weight of the total nitrogen, corresponding to M. S. T. value about from 30°-100° C. When our low molecular weight imidized products are partially neutralized the point of precipitation of the polymer from its aqueous solution, that is, the M. S. T. value will become progressively lower as the neutralization proceeds, until the M. S. T. will be less than 0° C. The imidized products of relatively lower molecular weight show only precipitation with decreasing M. S. T. as neutralization proceeds, whereas those of relatively higher molecular weight show gelation upon cooling after partial neutralization. Precipitation in the former case is instantaneous at the M. S. T., while gelation in the latter case involves a time factor and the solution must be kept at reduced temperature for some time for gelation to occur. In the case of higher molecular weight imidized polyacrylamides, insufficient neutralization may cause the product to show an M. S. T. rather than gelation.

The analytical data presented in the specification and claims are based on determinations within limits of error. For example, the proportions of acrylimide and acrylamide groups in the polymeric compounds of our invention are calculated from the values for total nitrogen content by the Dumas method and combined acrylic acid by the titration method with standard sodium hydroxide solution and phenolphthalein indicator. Since in ordinary routine microanalytic procedure for nitrogen, the permissible error is of the order of 0.4 actual per cent, and since the accuracy of the nitrogen analysis controls the corresponding accuracy of the calculation for imide content, the values quoted for the imide contents of the different polymers may be in error as much as 5 per cent of the actual.

The following examples will serve to illustrate the compounds of our invention and the process of their preparation.

Preparation of acrylyl chloride 792 grams of acrylic acid of melting point 11.5° C. or higher and 1190 grams of thionyl chloride were mixed in a 3 liter round bottom flask to which was attached a reflux condenser (one inch bore and 35 inch jacket) with a calcium chloride tube, and the mixture allowed to react spontaneously for about one hour and then gently heated on a steam bath for about four hours. At the end of this time, the evolution of hydrogen chloride has ceased. The resulting product was distilled through a fractionating column packed with glass helices and equipped with a variable take-off head. The fraction boiling between 67° and 75° C. was carefully redistilled through the same column. A yield of 620 grams of colorless acrylyl chloride, boiling point 73°–74° C. was obtained, equivalent to 69 per cent of theory. No trace of sulfur was detected in the product. The preferred technique requires an excess of acrylic acid thus reducing the quantity of unreacted thionyl chloride to a minimum.

Preparation of acrylamide 300 grams of acrylyl chloride were dissolved in 3000 cc. of dry benzene in a flask equipped with a wide bore gas inlet, an air condenser protected by calcium chloride tube and a motor-driven stirrer passing into the flask through a bearing that extended below the level of the liquid. The solution was cooled in an ice and salt bath to 10° C. Ammonia gas, prepared by volatilizing liquid ammonia and dried by passing the gas through a column of sodium hydroxide pellets, was admitted into the reaction mixture with stirring at such a rate that the reaction temperature did not rise above 15° C. When the odor of acrylyl chloride could no longer be detected in the reaction mixture (about 130 grams of ammonia were required), one liter of benzene was added and the suspension brought to boil on a steam bath. The mixture was then quickly filtered through a large Buchner funnel and the salt residue was brought to boil with 2 liters of fresh benzene. After filtering, the combined filtrates were chilled to crystallization. The inorganic salt was twice again extracted with the saturated mother liquor of the above crystallizations, the first time with 2000 cc., and the second time with 1200 cc. Each portion was chilled separately to obtain the crystals. The yield of combined crystals of acrylamide, after drying thoroughly under vacuum, was 168 grams or 72 per cent of theory.

Purification of acrylamide 400 grams of acrylamide were dissolved in 8 liters of thiophene-free benzene by heating on a steam bath. Should on oily residue be present, this can usually be dissolved by further addition of benzene. To the clear solution were added 30 grams of decolorizing carbon and the mixture boiled for about two minutes. It was then filtered through paper on which a layer of kieselguhr had been placed. The filtrate was chilled to 15° C. for crystallization. The crystals were collected on a Buchner funnel and washed with 500 cc. of fresh benzene. The process of dissolution in benzene, treatment with decolorizing carbon, filtering, crystallizing and washing was repeated once again. A yield of 300 grams of acrylamide, melting point 85°–85.2° C., nitrogen content of 19.53 per cent compared with calculated 19.72 per cent, was obtained after thorough drying of the crystals under vacuum.

Polymerization of acrylamide—Effect of alcohol in polymerization mixtures

The viscosity of molecular weight of the polyacrylamide varies materially with the concentration of alcohol in the polymerization mixtures. By increasing the alcohol content of water-alcohol mixture, the viscosity of the product will decrease in proportion.

In all-glass reflux outfits were placed 200 cc. of water-alcohol mixtures of the compositions given in the following Table I, 20 grams of acrylamide and 0.8 cc. of 30 per cent hydrogen peroxide. The reactions were heated in a 90° C. bath for a period of two and one-half hours. The viscosity of the dopes so obtained decreased with increasing amounts of alcohol. The sample containing 40 per cent alcohol turned cloudy on cooling, whereas the 50 per cent sample was cloudy while still in the hot bath. The samples were precipitated in ethanol, extracted with fresh portions of ethanol and dried first in a vacuum desiccator under constant vacuum, and then to constant weight at 55° C. at atmospheric pressure.

Table I

| Per cent Alcohol by Volume | c. c. of Distilled Water | c. c. of Absolute Alcohol | Yield | Specific Viscosity |
|---|---|---|---|---|
| 00 | 200 | 0 | 20.7 | 0.127 |
| 10 | 180 | 20 | 19.8 | 0.076 |
| 20 | 160 | 40 | 20.8 | 0.045 |
| 30 | 140 | 60 | 19.5 | 0.040 |
| 40 | 120 | 80 | 19.0 | 0.0032 |

*Example I.—Imidization by hydrobromic acid. Polymerization in 70–30 water-ethyl alcohol*

In all-glass reflux units, 20 gram samples of acrylamide were dissolved in 200 c. c. of 70–30 water-absolute ethyl alcohol. To each unit, there was added 0.8 c. c. of 30 per cent hydrogen peroxide and the flasks placed in a bath maintained at 90° C., for a period of about two and one-quarter hours. The flasks were then removed from the bath and allowed to stand for about 30 minutes at room temperature. There were added from a pipette to respective flasks 0, 2, 4, 7 and 10 c. c. of 48 per cent hydrobromic acid, which by analysis contained 0.722 gram of hydrogen bromide in each cubic centimeter. The reaction mixtures were thoroughly shaken and returned to the 90° C. bath for a period of 16 hours. All samples at the end of this time were clear and homogeneous, except the one to which 10 c. c. of hydrobromic acid had been added. In this case, the resin had precipitated from solution. None of the samples were acid to Congo red indicator.

added and the mixture heated at 90° C. in an all-glass reflux apparatus for a period of about two and one-half hours. The dope was cooled and divided into five equal portions. Each portion was placed in all-glass reflux units and to the respective units were added 0, 2, 5, 7 and 9 c. c. of 48 per cent hydrobromic acid. The samples were well shaken and returned to the 90° C. bath for a period of about 16 hours. The resins were isolated and purified in the manner described in preceding Example 1. The characteristics of the imidized products obtained are illustrated in following Table III.

*Table III*

| c. c. of 48% HBr | Yield, Grams | Specific Viscosity | | Per Cent | | | | M. S. T. |
| | | Water | 0.25% NH₃ | Acrylic Acid | Nitrogen | Imide | Amide | |
| | | | | | | | | °C. |
| 0.0 | | 0.111 | 0.415 | 4.20 | 17.28 | 20.9 | 74.9 | below 0 |
| 2.0 | 21.5 | 0.128 | 0.343 | 2.74 | 16.51 | 31.4 | 65.9 | below 0 |
| 5.0 | 18.5 | 0.206 | 0.833 | 7.16 | 15.05 | 38.4 | 54.4 | 11 |
| 7.0 | 19.1 | | | 1.46 | 9.90 | 14.99 | 32.4 | 57.7 | 33 |
| 9.0 | 17.4 | | | 2.03 | 12.25 | 13.69 | 41.3 | 46.5 | 56 |

Sufficient hydrobromic acid was then added to each reaction mixture to make the dope definitely acid to Congo red and the dope precipitated in two liters of methanol. The sample containing the 10 c. c. portion of hydrobromic acid was acidified and the cake well kneaded in the liquid, after which the cake and solution were poured into two liters of methanol. All the samples were extracted with fresh methanol until the extract was free from bromide and dried, first under vacuum and then to constant weight at 55° C. Analysis indicated that bromide and alkoxyl groups were present only in traces. The following Table II illustrates the characteristics of these imidized polyacrylamides.

*Example III.—Imidization by various acids. Polymerization in 70–30 water-ethyl alcohol*

20 gram samples of acrylamide were polymerized at 90° C. for two and one-half hours in 200 c. c. of 70–30 by volume mixtures of distilled water-ethyl alcohol with 0.8 c. c. of 30 per cent hydrogen peroxide. To the respective samples were added the acids in the amounts given in Table IV and the mixtures returned to the 90° C. bath for a period of 16 hours. The samples, if no longer acid to Congo red, were then acidified with the same acid as used for imidization, and precipitated in methyl alcohol and extracted with fresh methyl alcohol.

All the precipitates were finally dried, first in a

*Table II*

| c. c. of 48% HBr | Yield, Grams | Sp. Viscosity | | Per cent | | | | M. S. T. |
| | | Water | 0.25% NH₃ | Acrylic Acid | Nitrogen | Imide | Amide | |
| | | | | | | | | °C. |
| 0.0 | 16.7 | 0.048 | 0.107 | 2.89 | 17.38 | 20.8 | 76.3 | below 0 |
| 2.0 | 17.9 | 0.043 | 0.145 | 2.09 | 16.95 | 27.5 | 70.3 | below 0 |
| 4.0 | 16.9 | 0.051 | 0.305 | 4.85 | 15.63 | 36.9 | 58.3 | 5 |
| 7.0 | 17.0 | | | 0.542 | 7.91 | 14.59 | 41.7 | 50.4 | 35 |
| 10.0 | | | | 0.462 | 12.30 | 12.56 | 55.6 | 32.1 | 86 |

*Example II.—Imidization by hydrobromic acid. Polymerization in 90–10 water-ethyl alcohol*

100 grams of acrylamide were dissolved in 1000 c. c. of 90–10 distilled water-absolute ethyl alcohol, 4 c. c. of 30 per cent hydrogen peroxide vacuum and then at 55° C. to constant weight. Where the acid belonged to the weaker acids, the imidization time was more extended. The characteristics of these imidized products are illustrated in the following Table IV.

*Table IV*

| Amount Acid per 20 grams Resin | Imidization Time at 90° C. | Per cent | | | | M. S. T. |
| | | Acrylic Acid | Nitrogen | Imide | Amide | |
| | | | | | | °C. |
| 3.5 c. c. Sulfuric | 16 hours | 9.13 | 14.48 | 40.2 | 50.7 | 49 |
| 5.2 c. c. Hydrochloric | 16 hours | 7.22 | 15.55 | 32.4 | 60.4 | 28 |
| 4.0 c. c. Nitric | 16 hours | 7.73 | 15.42 | 32.4 | 59.6 | 33.5 |
| 50.0 c. c. Phosphoric | 3 hr. 50 mins | 9.11 | 15.48 | 28.8 | 62.1 | 25 |
| 40.0 gram Tartaric | 40 hours | 6.91 | 15.96 | 29.0 | 64.1 | 1 |
| 30.0 gram Malonic | 40 hours | 4.44 | 16.31 | 29.8 | 65.8 | 0 |
| 14.6 gram Oxalic | 16 hours | 9.17 | 14.93 | 33.5 | 56.7 | 26 |
| 10.0 gram Dichloracetic | 21 hours | 4.21 | 16.68 | 25.8 | 70.0 | 1 |
| 14.5 gram p-Toluene Sulphonic | 16 hours | 9.20 | 14.17 | 43.8 | 46.9 | 64 |
| 6.5 c. c. of 71% Perchloric | 16 hours | 9.35 | 14.26 | 42.5 | 48.2 | 62 |

Example IV.—Imidization by hydrobromic acid. Polymerization in water

A. 20 grams of acrylamide were dissolved in 200 cc. of distilled water in an all-glass reflux apparatus and polymerized for one and one-quarter hours at 90° C., in the presence of 0.40 c. c. of 30 per cent hydrogen peroxide. The extremely viscous dope obtained was diluted with 300 c. c. of distilled water and shaken until a homogeneous mixture. To this was added, 50 c. c. of hydrobromic acid, containing about 0.79 gram of hydrogen bromide per cubic centimeter, and the mixture heated on a steam bath. After two hours of heating, the solution showed opalescence, and after three hours began to separate into two phases. A small portion of this dope, still acid to Congo red indicator, was precipitated in methanol, extracted free from bromide with fresh methanol and dried, first under vacuum and then for six hours at 55° C. Analysis of this sample gave the following results:

| | |
|---|---|
| Combined acrylic acid | 10.45% |
| Nitrogen | 14.07% |
| Acrylamide | 47.80% |
| Acrylimide | 41.80% |
| M. S. T. | No sharp point noted. On cooling the dope set to a clear gel |

The main portion of the above reaction mixture was treated with an excess of concentrated ammonium hydroxide and then precipitated in methanol. The fibrous precipitate thus obtained was extracted free from bromide with methanol and dried in similar manner as the smaller portion. The odor of ammonia was observed during the 55° C. drying. This material was soluble in water at room temperature to a smooth dope. Precipitation occurred upon acidification of the dope.

5 grams of the above ammonium derivative were heated at 110° C. After 30 minutes heating, the cold water dope was gelatinous, but upon heating to 80° C., a clear smooth dope was obtained which set to a soft, slightly opalescent gel on cooling to 0° C. After 60 minutes heating at 110° C., the polymer was no longer soluble in cold water and gave a gelatinous type dope with hot water.

B. 100 grams of acrylamide were polymerized in 1000 c. c. of distilled water with 2.0 c. c. of 30 per cent hydrogen peroxide at 90° C. for a period of about one and one-quarter hours. To the dope were added 1500 c. c. of distilled water and 250 c. c. of hydrobromic acid (concentration 0.79 grams of hydrogen bromide per c. c.), and after being thoroughly mixed, the dope was heated on a steam bath until two phases began to form. The mixture, still acid to Congo red indicator, was poured into 10 liters of methanol, with stirring, and the granular precipitate so obtained was extracted free from bromide with fresh portions of methanol. The product was dried under vacuum, followed by two hours heating in an oven at 55° C. The yield was 76 grams. Analysis of the product gave the following results:

| | |
|---|---|
| Combined acrylic acid | 13.80% |
| Nitrogen | 13.26% |
| Acrylamide | 43.90% |
| Acrylimide | 42.30% |
| M. S. T. | Above 100° C. |

There was partial solution at 100° C. to yield a turbid solution. The turbidity increased immediately with cooling.

The above imidized polymer, while completely in the acid form did not dissolve completely in water to yield a clear solution, even at 100° C. The additions of small amounts of base progressively lowered the temperature at which a clear dope was obtainable, and this on cooling formed a gel, instead of a precipitate.

One gram of the above imide was suspended in 20 c. c. of distilled water and the suspension heated to 80°–85° C. Aqueous sodium hydroxide (0.110 normal) was added in one-half cubic centimeter portions, it requiring approximately two and one-half cubic centimeters to obtain a clear solution. At this point, analysis indicated that 14.4 per cent of the carboxyl groups had been neutralized. A portion of the hot dope was coated on a glass plate at room temperature. In a short time, the coating had gelled to a soft gel which, on being left overnight, dried to a clear film. The main portion of the dope was immersed in a bath of cold water. In a short time, the dope had set to a turbid, moderately firm gel. This gel softened, but did not become fluid at room temperature.

Example V.—Imidization by hydrobromic acid. Treatment with ammonia 100 grams of polyacrylamide were polymerized in water with 30 per cent hydrogen peroxide and then imidized with hydrobromic acid, following the procedure described in preceding Example IV. The vacuum and oven dried product obtained had a content of 13.34 per cent by weight of nitrogen and 13.64 per cent by weight of combined acrylic acid. Samples of the resinous product were dissolved in various amounts of dilute ammonium hydroxide (0.102 normal), with stirring at 90° C., and the concentration in each sample adjusted to 4 per cent by weight of resin, by water addition. The results are given in the following Table V.

Table V

All gelations are at 4 per cent concentration of resin in water. The pH was adjusted by addition of 0.102 N. NH₄OH to hot dope and was determined at 45° C.

| Approx. c. c. of 0.102 N NH₄OH/gram of resin | pH of dope at 45° C. | Gelation | |
|---|---|---|---|
| | | Appearance at room temperature | Appearance at 7° C. |
| 3 | 3.87 | Soft-turbid gel | Firm, turbid gel. |
| 3 | 3.90 | Soft, turbid gel | Do |
| 4.5 | 4.04 | Very soft gel | Firm gel, some turbidity. |
| 5.0 | 4.13 | Not gelled | Gelled, some turbidity. |
| 6.0 | 4.23 | do | Gelled, slight turbidity. |
| 7.0 | 4.35 | do | Gelled, almost clear. |

Example VI.—Imidization to high imide content 50 grams of acrylamide were polymerized for one and one-half hours in a bath at 90° C., in 500 c. c. of distilled water with 1.0 c. c. of 30 per cent hydrogen peroxide. The viscous dope so obtained was diluted with 412.5 c. c. of distilled water and 405 c. c. of concentrated nitric acid (containing 1.068 grams of HNO₃ per cubic centimeter). The reaction mixture was well shaken and returned to the 90° C. bath for a period of about two hours. The turbid solution was then poured into 2500 c. c. of ice and water mixture. There was obtained a fibrous precipitate, which was purified by washing with distilled water and two 600 c. c. portions of methanol, the precipitate being allowed to soak in the methanol for about an hour with each extraction. The product was dried under constant vacuum at room temperature and then to constant weight in an oven at 55° C. The yield was 33 grams. This product gave the following analytical results.

| | Per cent |
|---|---|
| Combined acrylic acid | 28.12 |
| Nitrogen | 8.41 |
| Combined acrylamide | 4.2 |
| Combined acrylimide | 67.7 |

One gram of the product readily dispersed in distilled water containing base on warming. The addition of 10 c. c. of 0.10 normal ammonium hydroxide, caused the solution to gel on cooling to room temperature.

*Example VII.—Imidization of polymethacrylamide*

A. 20 grams of methacrylamide, 200 c. c. of distilled water and 0.40 c. c. of 30 per cent hydrogen peroxide were heated together in an all-glass reflux apparatus at 90° C., for a period of about 7 hours. A cloudy dope was obtained. To the hot dope, there were added 6 c. c. of hydrobromic acid (0.717 gram of hydrogen bromide per cubic centimeter), whereupon the resin precipitated immediately in the form of a cake. The heterogeneous mixture was returned to the 90° C. bath and heated for a period of about 16 hours. The cake did not dissolve and the supernatant liquid was not acid to Congo red indicator. The liquid was discarded and the cake extracted with methanol. As the cake turned hard and brittle, it was crumbled to facilitate extraction. When free from bromide, it was dried under vacuum and then brought to constant weight at 55° C. The yield was 11 grams. Analysis of the product gave the following values:

| | |
|---|---|
| Combined methacrylic acid | 1.63% |
| Nitrogen | 12.59% |
| Combined methacryimide | 49.50% |
| Combined methacrylamide | 48.90% |
| M. S. T. | Above 100° C. |

B. 20 grams of methacrylamide, 180 c. c. of distilled water and 0.40 gram of ammonium persulfate were heated together in all-glass reflux apparatus at 90° C. for a period of about 65 minutes. No precipitation occurred either during the heating, or upon cooling a small sample. To the hot dope, there were added 6 c. c. of hydrobromic acid (0.717 gram of hydrogen bromide per c. c. of hydrobromic acid), whereupon the dope became opalescent, but did not precipitate. The reaction was returned to the 90° C. bath and heated for a period of about 16 hours. The resin was obtained in the form of a precipitated cake, which was purified by extraction with methanol and dried under vacuum, then to constant weight at 55° C. The resin had the following chemical and physical properties:

| | |
|---|---|
| Combined methacrylic acid | 2.38% |
| Nitrogen | 12.34% |
| Combined methacrylimide | 50.70% |
| Combined methacrylamide | 46.90% |
| M. S. T. | Above 100° C. |

*Example VIII.—Imidized polyacrylamides prepared from polyacrylyl chloride*

250 grams of acrylyl chloride were diluted with 250 c. c. of dry 1,4-dioxane in a Pyrex tube equipped with a reflux condenser protected from moisture by a calcium chloride tube. The tube was so constructed that it lay in a horizontal position, while the condenser was attached in an upward extending position. The tube and its contents were irradiated by a quartz mercury arc operating at 150 volts and 4 amperes. The tube was 11 inches from the light source. After about 12.5 hours, a clear viscous dope was obtained. This was diluted with an equal volume of dry dioxane and poured into dry benzene. The precipitate of the polymer so obtained was washed with several changes of dry benzene and then dried in a vacuum desiccator over calcium chloride under constant vacuum. The yield was 208 grams or 83 per cent of theoretical. The specific viscosity in acetone was 0.035. The polymer was completely soluble in acetone and in dioxane.

150 grams of the polyacrylyl chloride prepared as described above, were dispersed in 1500 c. c. of dry acetone and the solution divided into five equal portions. Each aliquot was added from a dropping funnel to 350 c. c. of liquid ammonia, which was stirred by a motor driven stirrer. A white precipitate formed. The acetone and ammonia were removed by decantation and the precipitate dissolved in water and filtered. The aqueous dopes of the five aliquots were combined and poured in a fine stream into 5 liters of methanol, while being agitated by a mechanical stirrer. The precipitate was extracted with several changes of fresh methanol, followed by acetone, and then dried at room temperature over calcium chloride in a vacuum desiccator under constant vacuum. The yield was 106 grams compared with a theoretical of 117 grams. The nitrogen content was 15.57 per cent. The product precipitated from its aqueous solution on addition of excess of hydrochloric acid. Analysis of a further purified sample of the product gave 11.05 per cent by weight of combined acrylic acid, 31.6 per cent acrylimide and 57.4 per cent acrylamide groups.

What we claim is:

1. An imidized polyacrylamide consisting of from 30 to 60 per cent by weight of acrylimide groups, and from 70 to 40 per cent by weight of acrylamide and combined acrylic acid groups, the said acrylic acid group being present in quantity not less than 5 per cent and not more than 20 per cent by weight of the polymer.

2. A process for increasing the imide group content of a water-soluble polymer selected from the group consisting of water-soluble polyacrylamides and water-soluble poly-α-methacrylamides to from 25 to 70 per cent by weight of the polymer which comprises heating an aqueous solution of the polymer, in the presence of an acid selected from the group consisting of hydrobromic, sulfuric, nitric, hydrochloric, phosphoric, dichloroacetic, paratoluene sulphonic, oxalic, tartaric and malonic acids.

3. A process for increasing the imide group content of a water-soluble polyacrylamide to from 25 to 70 per cent by weight of the polymer which comprises heating an aqueous solution of the polymer in the presence of hydrobromic acid.

4. A process for increasing the imide group content of a water-soluble polyacrylamide to from 30 to 60 per cent by weight of the polymer which comprises heating an aqueous solution of the polymer in the presence of hydrobromic acid.

5. A process for increasing the imide group content of a water-soluble polyacrylamide to from 25 to 70 per cent by weight of the polymer which comprises heating an aqueous solution of the polymer in the presence of sulfuric acid.

6. A process for increasing the imide group content of a water-soluble polyacrylamide to from 30 to 60 per cent by weight of the polymer which comprises heating an aqueous solution of the polymer in the presence of sulfuric acid.

7. A process for increasing the imide group content of a water-soluble polyacrylamide to from 25 to 70 per cent by weight of the polymer which comprises heating an aqueous solution of the polymer in the presence of nitric acid.

8. A process for increasing the imide group content of a water-soluble polyacrylamide to from 30 to 60 per cent by weight of the polymer which comprises heating an aqueous solution of the polymer in the presence of nitric acid.

9. An imidized polyacrylamide consisting of 41.8 per cent by weight of acrylimide groups, 47.8 per cent by weight of acrylamide groups and 10.4 per cent by weight of combined acrylic acid groups.

10. An imidized polyacrylamide consisting of 42.3 per cent by weight of acrylimide groups, 43.9 per cent by weight of acrylamide groups and 13.8 per cent by weight of combined acrylic acid groups.

11. An imidized polyacrylamide consisting of 55.6 per cent by weight of acrylimide groups, 32.1 per cent by weight of acrylamide groups and 12.3 per cent by weight of combined acrylic acid groups.

LOUIS M. MINSK.
WILLIAM O. KENYON.

REFERENCES CITED

The following references are of record in the file of this patent:

UNITED STATES PATENTS

| Number | Name | Date |
|---|---|---|
| 2,133,257 | Strain | Oct. 11, 1938 |
| 2,289,540 | Dittmar et al. | July 14, 1942 |

FOREIGN PATENTS

| Number | Country | Date |
|---|---|---|
| 475,671 | Great Britain | Nov. 24, 1937 |